United States Patent [19]

Chakrabarti et al.

[11] Patent Number: 5,045,707

[45] Date of Patent: Sep. 3, 1991

[54] LASER DETECTION AND DISCRIMINATION SYSTEM

[75] Inventors: Kishalaya Chakrabarti, Rockville; Veerendra K. Mathur, Beltsville, both of Md.

[73] Assignee: The United States of America as represented by the Secretary of the Navy, Washington, D.C.

[21] Appl. No.: 394,457

[22] Filed: Aug. 16, 1989

[51] Int. Cl.$^5$ .............................. G01J 5/54; G01J 5/56
[52] U.S. Cl. ................................ 250/484.1; 250/458.1
[58] Field of Search ....................... 250/458.1, 484.1 B, 250/484.1

[56] References Cited

U.S. PATENT DOCUMENTS

| | | | |
|---|---|---|---|
| 4,427,570 | 1/1984 | Chen et al. | 252/301.4 R |
| 4,604,225 | 8/1986 | Chen et al. | 252/301.4 R |
| 4,654,533 | 3/1987 | Teshima et al. | 250/484.1 |
| 4,751,148 | 6/1988 | Popma et al. | 428/690 |
| 4,806,772 | 2/1989 | Lindmayer | 250/484.1 |
| 4,806,825 | 2/1989 | Catherall et al. | 313/486 |
| 4,822,520 | 4/1989 | Lindmayer | 252/301.45 |

Primary Examiner—Constantine Hannaher
Assistant Examiner—Jacob M. Eisenberg
Attorney, Agent, or Firm—Kenneth E. Walden; Jacob Shuster

[57] ABSTRACT

Magnesium oxide sensing material is pretreated and charged by UV radiation to identify impingement thereon of radiation from a near infrared laser source by detection of blue emissions which persist for an unusually long period of time, avoiding frequent respotting and recharging. When heated to thermoluminescence peaks above room temperature by irradiation from a far infrared laser source, the magnesium oxide exhibits green luminescence enabling wavelength discrimination between detection of near and far infrared laser sources. Such pretreated magnesium oxide also produces green emissions when irradiated by UV laser sources, to distinguish between detection of the UV laser sources and the far infrared laser sources by discrimination between different fading behaviors of the green emissions.

21 Claims, 2 Drawing Sheets

LASER DETECTION AND DISCRIMINATION SYSTEM

BACKGROUND OF THE INVENTION

This invention relates generally to the detection of unknown laser sources and more particularly to a method involving stimulated photoluminescence of pretreated solid state phosphor material to effect detection without frequent recharging or respotting of laser beam impingement with respect to near infrared lasers.

The use of alkaline earth sulfides, doubly doped with rare earth ions for solid state photoluminescent sensors to detect and discriminate between infrared lasers of the near and far type is disclosed in copending application U.S. Serial No. 385,032 filed Jul. 25, 1989. Such type of photoluminescent sensors utilized for detection purposes only, are marketed for example by Quantex Corporation of Rockville, Md. as disclosed in its U.S. Pat. Nos. 4,806,772 and 4,822,520 to Lindmayer.

The use of alkaline earth oxides as a luminescent material excited by ultraviolet radiation is also known, as disclosed for example in U.S. Pat. No. 4,806,825 to Catherall et al. and U.S. Pat. No. 4,751,148 to Popma et al. According to U.S. Pat. No. 4,427,570 to Chen et al., thermochemically reduced alkaline earth oxides, including magnesium oxide, have F center luminescence that is long lived near room temperature becuase of the presence of H$^-$ion electron traps. The latter patents do not expressly suggest use of MgO in sensors for detection of and discrimination between unknown external laser sources based on stimulated photoluminescence emissions.

The use of solid state luminescent material excited to emit visible light after discontinuance of excitation was also known as indicated in column 1, lines 38–41 of U.S. Pat. No. 4,195,226 to Robbins et al. According to the Robbins et al. patent, relatively long periods of luminescence after discontinuance of excitation, was deemed to be undesireable in the associated applications. The photoluminescent material was therefore prepared in such a manner as to obtain rapid fading of the externally excited emissions, as stated in column 1, lines 42–46 of the Robbins et al. patent, in order to enhance collection of data.

It is therefore an important object of the present invention to provide an improved method of detecting and discriminating between unknown sources of laser beam radiation for military and commercial purposes.

It is another important object of the present invention in accordance with the foregoing object to provide a sensor utilitizing photoluminescent sensing material which may be stimulated, after being charged, by external radiation in the invisible spectral range to detect and discriminate between different unknown laser sources of such external radiation, and wherein the charging of the sensing material involves a charge trapping condition in which stimulation is limited to near and far infrared lasers.

SUMMARY OF THE INVENTION

In accordance with the present invention, magnesium oxide in solid form (crystal or powder) is utilized alone as photoluminescent material for a sensor to detect and discriminate between different unknown sources of laser beam radiation in the invisible spectral range. The magnesium oxide is pretreated in accordance with established prior art procedures, to create F type centers in its crystal lattice. By reason of such pretreatment the magnesium oxide may be charged by exciting the absorption band of approximately 5 eV of its F type defect centers. Once the sensing material is so charged, it is capable of detecting and discriminating between near and far infrared lasers with only the stimulating radiation from the far infrared laser being absorbed by the sensing material directly or through a supporting substrate. As to detection of UV laser radiation, charging of the sensing material is unnecessary. A combination of wavelength discrimination between detected blue and green emissions and fading time discrimination between detected green emissions respectively caused by far infrared radiation and ultraviolet (UV) radiation provides data on the temporal behavior of the emissions and/or different laser beam radiation for laser identification and other related data collection purposes.

BRIEF DESCRIPTION OF DRAWING FIGURES

A more complete understanding of the invention and many of the attendant advantages thereto will be readily appreciated as the same becomes better understood by reference to the following detailed description when considered in connection with the accompanying figures wherein.

DETAILED DESCRIPTION OF THE PREFERRED EMBODIMENTS

Figure 1:
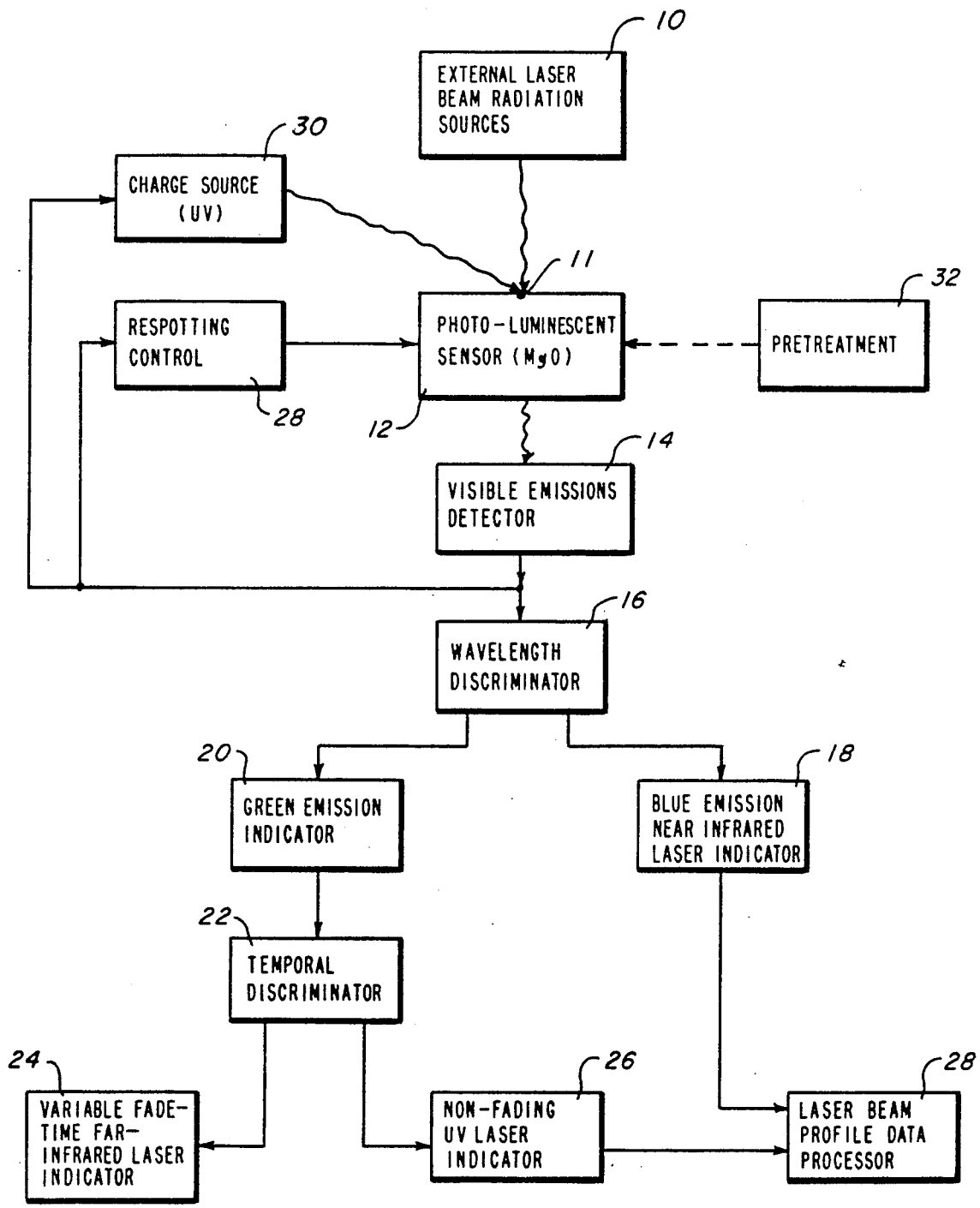
FIG. 1 is a block diagram schematically depicting the laser beam detection and discrimination system of the present invention.

Referring now to the drawing in detail, FIG. 1 diagrams a system for detecting and discriminating between unknown external sources 10 of laser beams within the invisible spectral range, including a 1.06μm Nd:YAG near infrared laser and a 10.6μm carbon dioxide far infrared laser used for ranging purposes, as well as an ultra-violet (UV) laser. A point of luminescence 11 on a photoluminescent sensor 12, at which the laser beam from one of the sources impinges, results in the stimulation of luminescence in the visible spectral range at such point 11. Stimulated luminescence emissions are detected by a detector arrangement 14. According to the embodiments diagrammed in FIG. 1, the stimulated emissions detected are in two visibly distinct color wavelength regions of the visible spectral range, respectively resulting from laser beam stimulating radiation within the invisible spectral range as aforementioned. More specifically, luminescence characterized by intense blue emissions corresponds to stimulation by radiation from the near infrared laser, whereas green emissions correspond to radiation originating from the aforementioned far laser and ultra-violet laser.

With continued reference to FIG. 1, the outputs of the detector 14 are applied to a wavelength discriminator 16 in order to distinguish between the blue and green emissions detected. Signal outputs reflecting detection of the blue emissions are operative through an indicator 18 to identify the near infrared (such as 1.06 μm Nd:YAG) laser as the source being detected by the system. Signal outputs reflecting detection of green emissions, on the other hand, are effective through indicator 20 to identify the far infrared (such as 10.6 μm carbon dioxide) laser or the ultra-violet laser as aforementioned.

In order to distinguish between green emissions respectively stimulated by laser beam radiation from the far infrared laser source and the ultra-violet laser source, a temporal or fading behavior discriminator 22 is provided to which the outputs of the green emissions indicator 20 are applied. The green emissions stimulated by radiation corresponding to the ultra-violet laser sources exhibit distinctively different behavioral patterns than the emissions resulting from infrared radiation originating with far infrared laser sources, as reflected by the signal outputs of the discriminator 22. Accordingly, the outputs of the discriminator 22 are respectively applied to indicators 24 and 26 as diagrammed in FIG. 1, to identify the far infrared and ultraviolet laser sources.

The foregoing laser detection and discrimination method diagrammed in FIG. 1, depends on certain operational and production factors associated with the photoluminesent sensor 12. The construction of such sensor according to one embodiment of the present invention is based on that of commercially available infrared sensor cards manufactured and marketed by Quantex Corporation of Rockville, Md. as aforementioned. In the latter type of sensor, luminescence is observed when an electron is released from its trapping site and recombines radiatively at the luminescence center 11 established on a layer of photoluminescent material disposed on a supporting substrate. The substrate must be periodically displaced for relocation or respotting of point 11 thereon as the photoluminescent material locally loses its luminescent property. A respotting control 28 is therefore associated with the sensor 12 of the laser detection and discrimination system as diagrammed in FIG. 1. Further, in the latter type of sensor 12 the photoluminescent material at its luminescence point 11 must be periodically recharged by excitation energy, such as ultra-violet radiation, from a charge source 30, as also diagrammed in FIG. 1. Respotting and recharging control of the sensor 12 through components 28 and 30 as diagrammed in FIG. 1 is therefore effected in accordance with the detected intensity of the stimulated emissions as reflected by the outputs of detector 14.

A critical feature of the present invention resides in the selection of a single phosphor as the photoluminescent material for the sensor 12 in the form of magnesium oxide (MgO). The MgO material is known to be transparent to radiation at all wavelengths up to approximately 8 eV. Pretreatment that creates F type centers in this material establishes electronic states between the valence and the conduction band enabling this material to absorb UV light close to 5 eV which raises electrons from the ground states to the excited states of the F type centers. Some of these electrons escape from the excited states to the conduction band resulting in subsequent charge trapping. Such trapped charges play the key role in laser stimulated emission and in the detection of the lasers. When stimulating invisible radiation from unknown laser sources 10 in the infrared and ulta-violet spectral ranges is applied to the treated MgO material of sensor 12 after it is charged, it will emit visible blue or green light as hereinbefore described with respect to FIG. 1. In accordance with the present invention, pretreatment enables the MgO to detect a near infrared laser beam by emission of blue luminescence which persists for an unexpectedly long period of time. Constant respotting and recharging of the MgO sensor is therefore unnecessary as in the case of doped alkaline earth sulfides from which laser stimulated emissions fade rapidly. The phenomonem involved in the prolonged blue luminescence of the pretreated and charged MgO sensing material, while not fully understood at this time, may be utilized to advantage in accordance with the present invention for collection of laser detection data.

Figure 2:
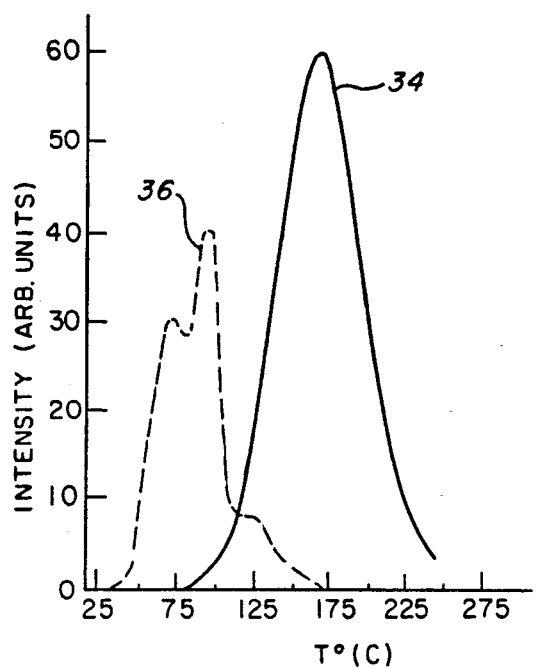
FIG. 2 is a graph depicting thermoluminescent properties of magnesium oxide pretreated in accordance with the present invention.

Also in accordance with the present invention, pretreatment of the MgO phosphor material as indicated in FIG. 1 by reference numeral 32 involves either thermochemical reduction as disclosed in the Chen et al. patent aforementioned, the disclosure of which is incorporated herein by reference or by neutron irradiation pursuant to certain embodiments. A single crystal of MgO material in the sensor 12 when so treated in accordance with such embodiments of the present invention exhibits thermoluminescence when irradiated by ultra-violet radiation from the charge source 30 and heated above room temperature as characterized by curves 34 and 36 in FIG. 2. Curves 34 and 36 respectively correspond to the thermoluminescence of the MgO material that is thermochemically reduced and neutron irradiated. Such treatments as well as other possible treatments which create F type centers in the MgO crystal to effect absorption in the ultra-violet region (5.0 eV) may be utilized. UV irradiation from the recharge source 30 excites the F and F+ electrons resulting in escape of electrons to the conduction band and subsequent trapping at other sites in the lattice of the MgO crystal. Thermal release of the trapped electrons occurs at approximately 175° C. for the thermochemically reduced MgO and at respectively 135° C. for the neutron irradiated MgO as depicted by maximum intensity glow peaks of curves 34 and 36 in FIG. 2. In the case of neutron irradiated MgO, two thermoluminescence (TL) glow peaks are observed at the lower temperatures associated as depicted in FIG. 2. The low temperature TL peaks may be exploited to detect low power far infrared lasers, in which case heating to a high temperature is not necessary. It is the glow peaks of curves 34 and 36 which makes the MgO material ideal for information storage purposes because of thermal stability at room temperatures for long periods of time. The thermally stable deep traps involved in such laser stimulated emission activity accounts for the effective laser detection and identification objectives achieved by the present invention.

Figure 3:
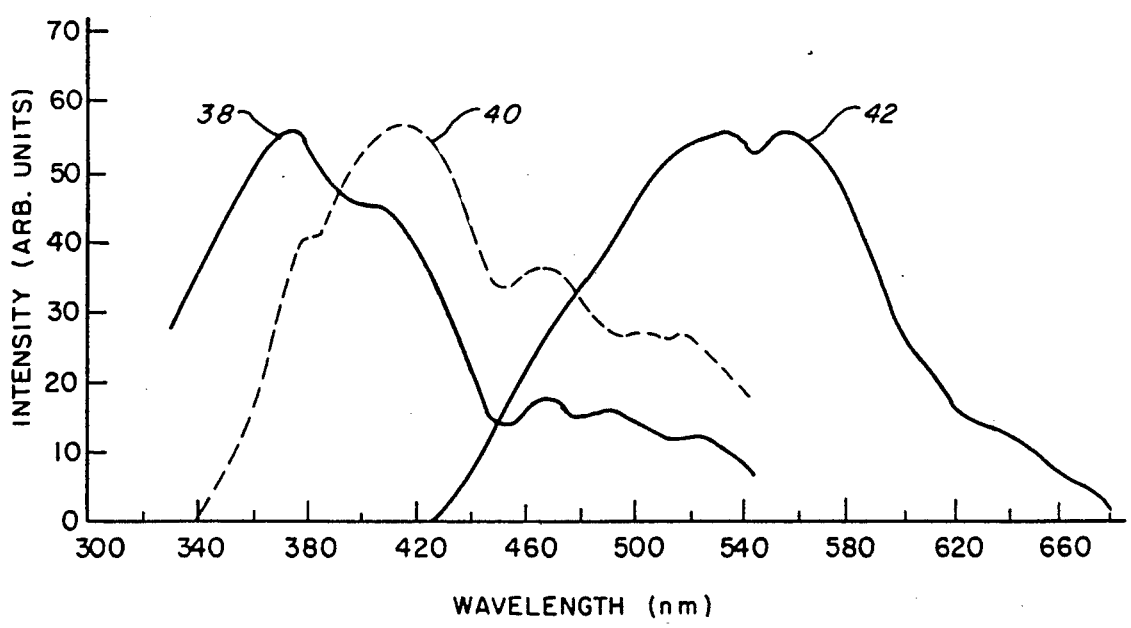
FIG. 3 is a graph depicting the stimulated emission properties of the pretreated magnesium oxide utilized in accordance with the present invention.

Laser stimulation by external infrared radiation of the treated MgO crystal of sensor 12 after charging results in photoluminescent emissions which vary in intensity with wavelength as depicted by curves 38 and 40 in FIG. 3. The intense blue emissions, resulting from near infrared laser (1.06 μm Nd:YAG) stimulation, peaks in intensity at a wavelength of approximately 370 nm as depicted by curve 38 for the thermochemically reduced MgO crystal, while curve 40 depicts such blue emissions peaking at a wavelength of approximately 400 nm for the neutron irradiated MgO crystal. Curve 42 in FIG. 3 depicts green emissions which peak in intensity at wavelengths between 520 and 550 nm for the thermochemically reduced MgO crystal when heated near the high tempeature TL peak. Such heating may also be achieved by far infrared stimulating radiation from the carbon dioxide laser (10.6 μm) when the laser beam is absorbed by the MgO directly or through a supporting substate. Because of the distinctly different wavelength peaks for the blue and green emissions, respectively corresponding to the near and far infrared laser sources, discrimination between the near and far infrared laser sources is readily effected by discriminator 16 and indicators 18 and 20.

In the case of near infrared laser sources, stimulated blue emissions during luminescence periods of prolonged duration decay only 50% after one-half hour of continuous exposure of the treated MgO crystal to stimulating infrared radiation. Stimulation by infrared radiation from far infrared laser sources on the other hand, as depicted by green emission curve 42 in FIG. 3, may be achieved by direct absorption through excitation of optical phonons to heat the MgO crystal, or by heating of the sensor substrate leading to the dominant green emissions. Such green emissions decay with time so as to require recharging. Green emissions may also result from photoluminescence caused directly by an ultra-violet laser source so that no charging of the MgO crystal is required. The green emissions are therefore characterized by the temporal behavior respectively associated with the laser sources themselves. Accordingly, by discriminating between distinctly different fading behaviors for green emissions respectively resulting from a far infrared laser source and an ultra-violet laser source through discriminator 22, the type of laser being detected may be identified through indicators 24 and 26 as diagrammed in FIG. 1. In the case of green emissions which build up and fade with time, a far infared laser beam would be identified through indicator 24, while green emissions having subtantially no fading identify a UV laser beam through indicator 26. Because of the latter non-fading nature of the green emission caused by UV laser radiation and the prolonged blue luminescence of the MgO sensing material caused by near infrared laser radiation, the collection of data on spatial impingement profiles of laser beams from the latter laser sources is enhanced through data processor 28, to which the indicators 26 and 18 are connected as diagrammed in FIG. 1.

A further advantage realized in the use of treated MgO in accordance with the present invention, over commercially available sensing devices, resides in the lack of any adverse affect on sensing properties by nuclear or cosmic radiation. Presently available sensing cards on the other hand may experience significant loss of laser sensing properties in the presence of such radiation environments.

Obviously, numerous modifications and variations of the present invention are possible in light of the above teachings. It is therefore to be understood that within the scope of the appended claims the invention may be practiced otherwise than as specifically described herein.

What is claimed is:

1. For use in identifying external radiation from different laser sources by exposure of solid photoluminescent material to said external radiation resulting in detection of stimulated emissions from said material when charged, the improvement residing in the steps of: treating said photoluminescent material to enable charging thereof; and discriminating between substantially different fading behaviors of the stimulated emissions detected.

2. The improvement as defined in claim 1 wherein said photoluminescent material is magnesium oxide.

3. The improvement as defined in claim 2 wherein said step of treating the photoluminescent material includes thermochemical reduction thereof.

4. The improvement as defined in claim 2 wherein said step of treating the photoluminescent material includes neutron irradiation thereof.

5. The improvement as defined in claim 1 wherein said step of treating the photoluminescent material includes thermochemical reduction thereof.

6. The improvement as defined in claim 1 wherein said step of treating the photoluminescent material includes neutron irradiation thereof.

7. The system as defined in claim 1 wherein said photoluminescent material is periodically recharged by excitation at a frequency necessary to maintain said stimulated emissions during periods of luminescence, further including prolongation of the periods of luminescence to substantially decrease said frequency of recharge.

8. The improvement as defined in claim 7 wherein the different laser sources detected correspond to the external radiation having wavelengths within the near and far infrared and ultra-violet regions of the invisible spectral range.

9. The improvement as defined in claim 8 wherein said photoluminescent material is a single crystal of magnesium oxide.

10. A method of identifying laser beam radiation having wavelengths within different regions of the invisible spectral range, including the steps of: charging thermochemically reduced magnesium oxide; continuously exposing the charged magnesium oxide to said laser beam radiation; detecting emissions from the magnesium oxide stimulated by said exposure to the laser beam radiation; discriminating between the detected emissions at different first and second visible wavelengths; and discriminating between different fading behaviors for the detected emissions at the first of said two different wavelengths to identify the different regions of the invisible spectral range associated with the laser beam radiation to which the magnesium oxide is exposed.

11. The method of claim 10 wherein the detected emissions at the second of the visible wavelengths decay in intensity by 50% after one-half hour of said continuous exposure of the magnesium oxide to the laser beam radiation.

12. A method of identifying laser beam radiation having wavelengths within different regions of the invisible spectral range, including the steps of: continuously exposing pretreated and charged photoluminescent material to said laser beam radiation; detecting emissions from said photoluminescent material following stimulation by said exposure to the laser beam radiation; discriminating between the detected emissions at different first and second visible wavelengths; and discriminating between different fading behaviors for the detected emissions at the first of said different wavelengths to identify at least one of the different regions of the invisible spectral range associated with the laser beam radiation to which the photoluminescent material is exposed.

13. The method of claim 12 wherein said photoluminescent material is magnesium oxide pretreated by neutron irradiation.

14. The method of claim 12 wherein the stimulated emissions at the second of the different wavelengths decay in intensity by approximately 50% after one-half hour of said continuous exposure of the photoluminescent material to the laser beam radiation.

15. The method of claim 12 wherein said photoluminescent material is magnesium oxide, radiation hardened by pretreatment creating F type defect centers.

16. In a method of discriminating between invisible radiation from different laser sources for identification thereof by detecting visible emissions at different first and second wavelengths from a charged sensing material stimulated by irradiation from said laser sources, the improvement residing in: pretreating the sensing material to enable charging thereof after which the visible emissions at substantially the first of the different wavelengths is detected during a prolonged period of luminescence; effecting said charging of the sensing material with radiant energy at an exciting wavelength; discriminating between different fading behaviors of the visible emissions detected at the second of the different wavelengths; and collecting beam profile data on the invisible radiation impinging the sensing material, from said detection of the visible emissions at said first of the wavelengths and at the second of the wavelengths corresponding to the fading behaviors of one of the laser sources.

17. The improvement as defined in claim 16 wherein said visible emissions at the second of the wavelengths is characterized by substantially no fading corresponding to said stimulation of the sensing material by said one of the laser sources at the exciting wavelength.

18. The improvement as defined in claim 17 wherein said sensing material is magnesium oxide and said exciting wavelength corresponds to that of ultraviolet radiation.

19. The system as defined in claim 18 wherein the other of laser sources respectively emit near and far infrared laser beams.

20. The system as defined in claim 17 wherein the other of laser sources respectively emit near and far infrared laser beams.

21. The improvement as defined in claim 16 wherein said sensing material is magnesium oxide and said exciting wavelength corresponds to that of ultraviolet radiation.

* * * * *